US005331352A

United States Patent [19]

Umemura et al.

[11] Patent Number: 5,331,352

[45] Date of Patent: Jul. 19, 1994

[54] CONTRAST CONTROL WHEREIN REFERENCE PULSE DETECTION OCCURS EVERY OTHER LINE PERIOD AND WHEREIN CLAMPING OCCURS IN REMAINING LINE PERIODS

[75] Inventors: Shunji Umemura, Chiba; Hiroyuki Nakazono, Kanagawa, both of Japan

[73] Assignee: Sony Corporation, Tokyo, Japan

[21] Appl. No.: 99,964

[22] Filed: Jul. 29, 1993

[30] Foreign Application Priority Data

Aug. 4, 1992 [JP] Japan .................................. 4-228021

[51] Int. Cl.[5] .......................... H04N 5/57; H04N 5/52

[52] U.S. Cl. ...................................... 348/682; 348/678

[58] Field of Search ............... 358/169, 164, 174, 175, 358/176, 177, 178, 179; H04N 5/57, 5/52, 5/53

[56] References Cited

U.S. PATENT DOCUMENTS

| | | | |
|---|---|---|---|
| 4,030,125 | 6/1977 | Bedell et al. | 358/169 |
| 4,323,923 | 4/1982 | Reneau | 358/171 X |
| 4,470,067 | 9/1984 | Mino | 358/174 X |
| 4,651,210 | 3/1987 | Olson | 358/164 X |
| 4,679,087 | 7/1987 | Torrano, Jr. et al. | 358/168 X |
| 4,695,886 | 9/1987 | Schofield | 358/176 |
| 4,751,577 | 6/1988 | Kawai | 358/174 X |
| 4,797,744 | 1/1989 | Klemmer et al. | 358/164 X |

FOREIGN PATENT DOCUMENTS

| | | | |
|---|---|---|---|
| 0273081 | 12/1986 | Japan | H04N 5/53 |
| 0065785 | 3/1988 | Japan | H04N 5/57 |

*Primary Examiner*—James J. Groody
*Assistant Examiner*—John W. Miller
*Attorney, Agent, or Firm*—Peter C. Toto; Jerry A. Miller

[57] ABSTRACT

The present invention provides a contrast control circuit capable of controlling the contrast even if the back porch is comparatively short. The contrast control circuit comprises monostable multivibrators (24, 26) which provides a background pulse and a reference pulse alternately, respectively, a switch (SW1) which clamps a video signal while the background pulse is HIGH so that the potential of the pedestal level is zero on an (N+1)th horizontal scanning line, and a switch (SW2) samples the leading edge of a reference pulse inserted in the video signal while the reference pulse is HIGH on an nth horizontal scanning line.

7 Claims, 6 Drawing Sheets

CONTRAST CONTROL WHEREIN REFERENCE PULSE DETECTION OCCURS EVERY OTHER LINE PERIOD AND WHEREIN CLAMPING OCCURS IN REMAINING LINE PERIODS

BACKGROUND OF THE INVENTION

1. Field of the Invention

The present invention relates to a contrast control circuit fit to be incorporated into, for example, a CRT controller.

2. Description of the Related Art

Some CRT monitor which displays pictures represented by signals provided by a computer inserts a reference pulse for contrast control in the back porch of the horizontal blanking interval of a video signal.

Referring to FIG. 4 showing a conventional CRT controller of such a type, an adder 2 inserts a reference pulse of a specified level in the back porch of a video signal in each horizontal scanning cycle, a video frequency amplifier 4 subjects the output of the adder 2 to gain control, a driver amplifier 6 amplifies the video signal provided by the video frequency amplifier 4 and gives its output to a CRT 8. The video signal provided by the video frequency amplifier 4 is applied also to a contrast control circuit 10. The contrast control circuit 10 detects the voltage of the reference pulse inserted in the video signal, compares the detected voltage of the reference pulse with a contrast voltage set by the user, and controls the gain of the video frequency amplifier 4 so that the detected voltage of the reference pulse coincides with the contrast voltage.

FIG. 5 is a block diagram of the contrast control circuit 10 and FIG. 6 is a time chart showing the output signals of the component of the contrast control circuit 10. A synchronous separation circuit 22 extracts the horizontal synchronizing signal from the input video signal and gives the extracted horizontal synchronizing signal to a monostable multivibrator 23. The monostable multivibrator 23 is triggered by the input horizontal synchronizing signal to give a reference pulse to a monostable multivibrator 25. Then, the monostable multivibrator 25 is triggered by the input pulse to give a background pulse as an closing command signal through a buffer 30A to a switch SW1. The reference pulse is given as an closing command signal through a buffer 32A to a switch SW2.

A capacitor C1 is inserted between an input terminal to which the output signal of the video frequency amplifier 4 (FIG. 4) is applied, and the input terminal of the switch SW2. The junction of the capacitor C1 and the switch SW2 is grounded through the switch SW1. A resistor R is inserted between the output terminal of the switch SW2 and one of the input terminals of an operational amplifier OP1. A variable voltage source is inserted between the other input terminal of the operational amplifier OP1 and a ground. The user operates the variable voltage source to set a contrast voltage VR1. A capacitor C2 is inserted between the former input terminal and the output terminal of the operational amplifier OP1.

The output video signal of the capacitor C1 is clamped by the switch SW1 so that the pedestal level is zero while the background pulse is HIGH. The switch SW2 samples the leading edge of the reference pulse inserted in the video signal while the reference pulse is HIGH. Accordingly, the level of the reference pulse is positive with respect to the ground potential for each horizontal scanning cycle.

The operational amplifier OP1 compares the voltage level of the reference pulse sampled by the switch SW2 with the contrast voltage VR1 set by the user and feeds back a voltage to control the gain of the video frequency amplifier 4 so that the voltage level of the reference pulse will coincide with the contrast voltage VR1 to the video frequency amplifier 4.

As shown in FIG. 7, the duration of the back porch must be about 1.6 μ sec or above to detect the leading edge of the reference pulse inserted in the video signal while the reference pulse is HIGH by inserting the reference pulse in the back porch and clamping the video signal so that the pedestal level is zero while the background pulse is HIGH. However, the duration of the back porch of some video signal among those used in recent years is less than 1.6 μ sec. When such video signals are used, the conventional contrast control circuit shown in FIG. 5 is unable to control the contrast.

SUMMARY OF THE INVENTION

Accordingly, it is an object of the present invention to provide a contrast control circuit capable of controlling contrast even if the duration of the back porch is less than 1.6 μ sec.

A contrast control circuit in a first aspect of the present invention comprises a voltage detecting means for detecting the reference voltage of a reference pulse inserted in a horizontal back porch once every N (N is an integer not smaller than two.) horizontal scanning cycles, and a control means for generating a contrast control signal on the basis of the reference voltage detected by the voltage detecting means and a specified voltage.

The reference voltage detecting means comprises, for example, a monostable multivibrator (26), a D flip-flop (28) and a switch (SW2) as shown in FIG. 1. The control means comprises, for example, an operational amplifier OP1 shown in FIG. 1.

A contrast control circuit in a second aspect of the present invention comprises a clamping means for clamping a video signal so that the potential of the pedestal level is held zero once every N (N is an integer not smaller than two.) horizontal scanning cycles, and a voltage detecting means for detecting the reference voltage inserted in a horizontal back porch once every N horizontal scanning cycles in a horizontal scanning cycle other than a horizontal scanning cycle in which the clamping means clamps a video signal so that the potential of the pedestal level is held zero, and a control means for generating a contrast control signal on the basis of the reference voltage detected by the voltage detecting means and a specified voltage.

The clamping means comprises, for example, a monostable multivibrator (24), a D flip-flop (28) and a switch (SW1) as shown in FIG. 1. The voltage detecting means comprises, for example, a monostable multivibrator (26), a D flip-flop (28) and a switch (SW2) as shown in FIG. 1. The control means comprises, for example, an operational amplifier (OP1) as shown in FIG. 1. Desirably, $N=2$.

The contrast control circuit in the first aspect of the present invention detects the reference voltage inserted in the horizontal back porch once every N horizontal scanning cycles and a contrast control signal is generated on the basis of the detected reference voltage and the specified voltage. Accordingly, the process of clamping a video signal to hold the potential of the pedestal level zero may be performed in a horizontal scanning cycle other than the horizontal scanning cycle in which the reference voltage is detected and, consequently, the back porch to be used for contrast control can be shortened.

The contrast control circuit in the second aspect of the present invention clamps a video signal so that the potential of the pedestal level is held zero once every N horizontal scanning cycles, detects the reference voltage in a horizontal back porch other than the horizontal back porch in which the a video signal is clamped to hold the potential of the pedestal level zero once every N horizontal scanning cycles, and generates a contrast control signal on the basis of the detected reference voltage and the specified voltage. Accordingly, the back porch used for contrast control can be shortened.

If N=2, the reference voltage of the reference pulse inserted in the horizontal back porch is detected in a horizontal scanning cycle subsequent to a horizontal scanning cycle in which the potential of the pedestal level is held zero. Accordingly, the reference voltage can be accurately detected for accurate contrast control even if the back porch is comparatively short.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
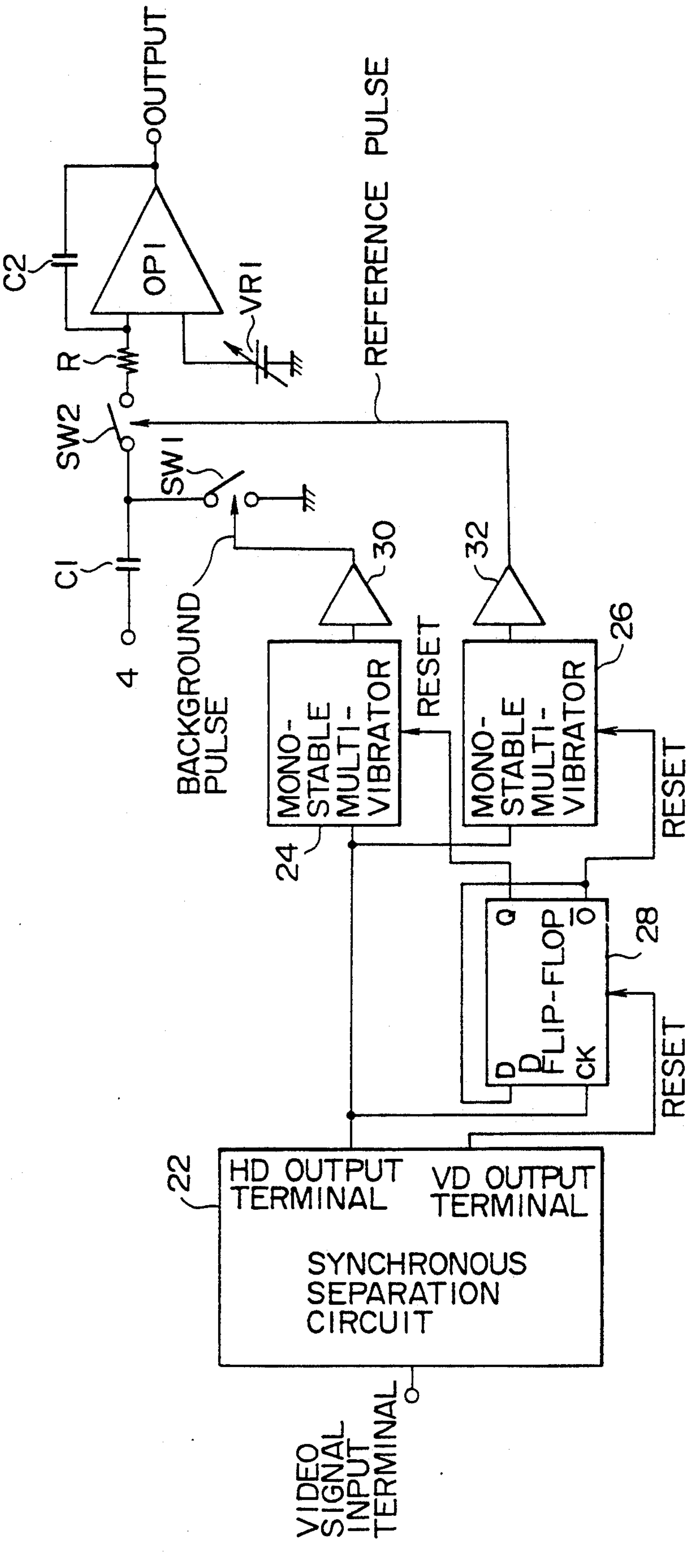
FIG. 1 is a circuit diagram of a contrast control circuit in a preferred embodiment according to the present invention.
Figure 4:
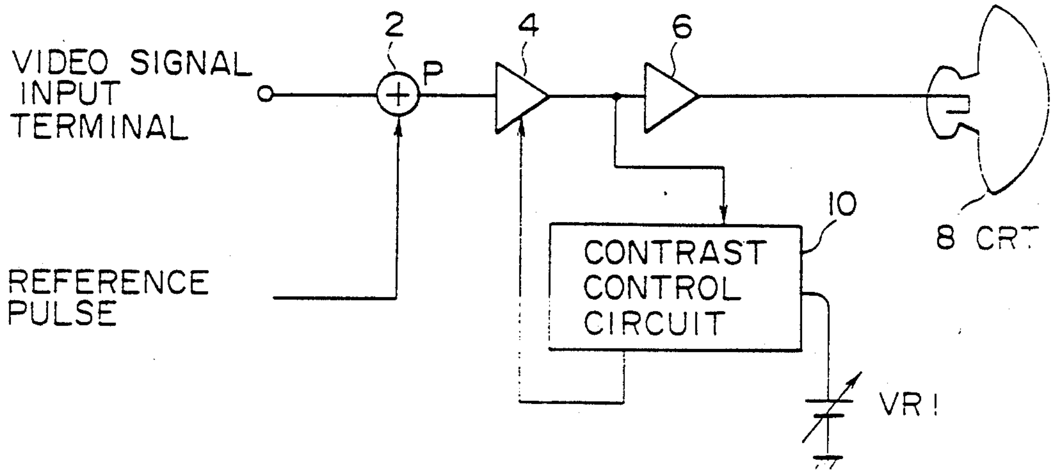
FIG. 4 Prior Art
FIG. 4 is a block diagram of a conventional CRT controller.
Figure 5:
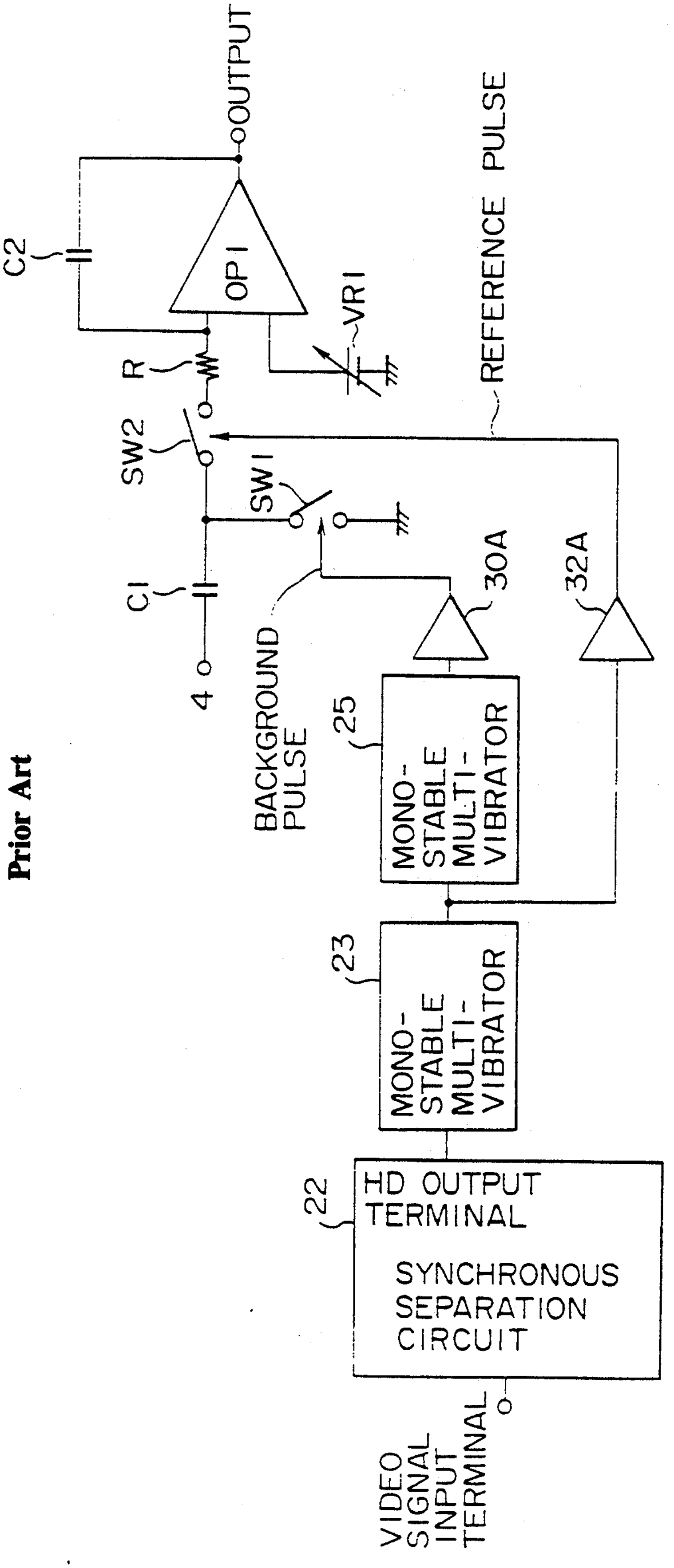
FIG. 5 Prior Art
FIG. 5 is a circuit diagram of a conventional contract control circuit.
Figure 6:
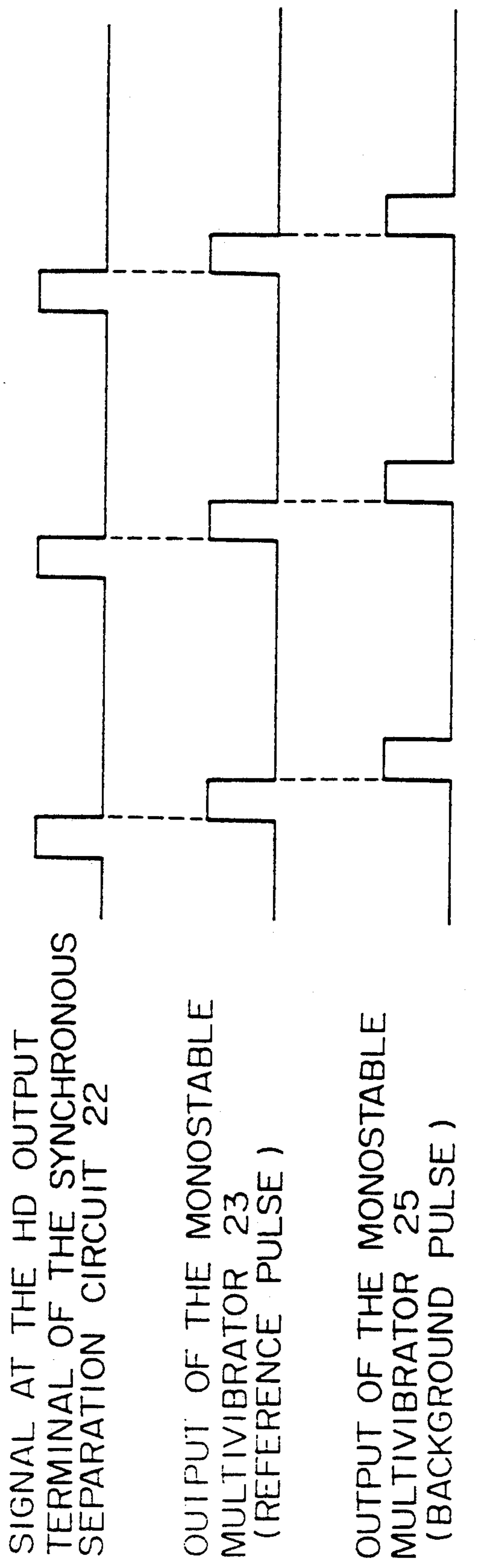
FIG. 6 Prior Art
FIG. 6 is a time chart showing signals generated by the components of the contrast control circuit of FIG. 5.
Figure 7:
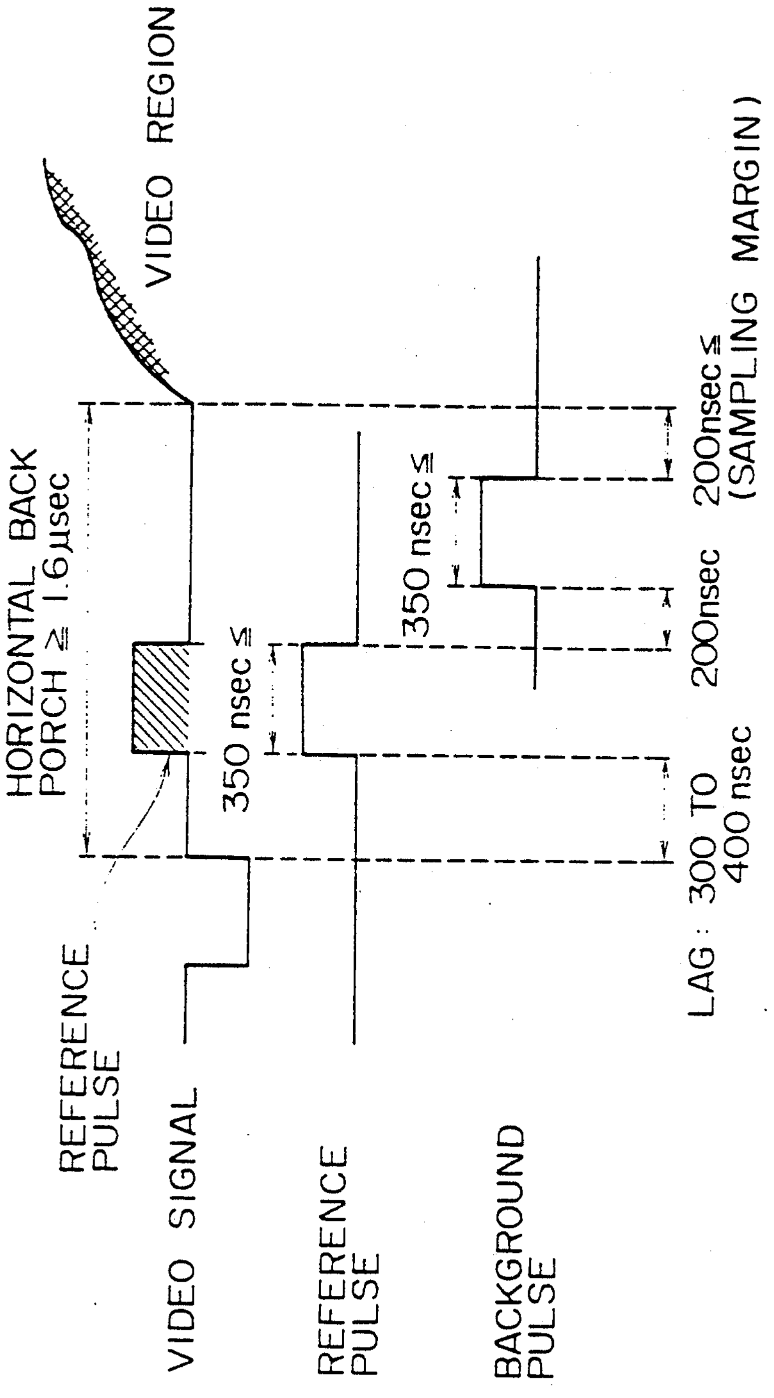
FIG. 7 Prior Art
FIG. 7 is a diagram showing the relation between a video signal, a reference pulse and a background pulse used in the contrast control circuit of FIG. 5.

A contrast control circuit in a preferred embodiment according to the present invention shown in FIG. 1 corresponds to the contrast control circuit 10 of the CRT controller shown in FIG. 4 and the configuration of a portion of the contrast control circuit comprising capacitors C1 and C2, switches SW1 and SW2, a resistor R and a variable voltage source for setting a specified contrast voltage VR1 and an operational amplifier OP1 is the same as that of the corresponding portion of the conventional contrast control circuit shown in FIG. 5.

Figure 2:
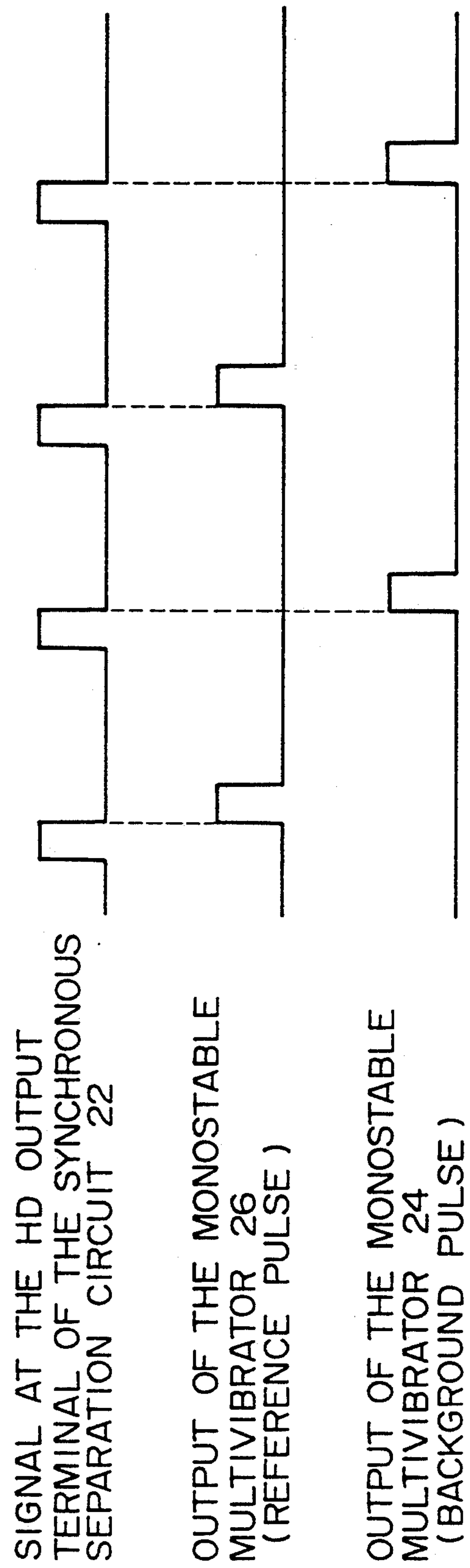
FIG. 2 is a time chart showing signals generated by the components of the contrast control circuit of FIG. 1.

Referring to FIG. 1, a synchronous separation circuit 22 extracts a horizontal synchronizing signal HD and a vertical synchronizing signal VD from an input video signal, and applies the horizontal synchronizing signal HD to a monostable multivibrators 24 and 26. The monostable multivibrator 24 is triggered by the horizontal synchronizing signal to provide a background pulse. The monostable multivibrator 26 is triggered by the horizontal synchronizing signal to provide a reference pulse. The horizontal synchronizing signal HD is applied also to the clock input terminal D of a D flip-flop 28. The inverted output of the D flip-flop is applied to the D input terminal of the D flip-flop 28. The output of the D flip-flop 28 and the inverted output are applied respectively to the reset terminal of the monostable multivibrator 24 and the reset terminal of the monostable multivibrator 26. Then, the monostable multivibrators 24 and 26 provide output pulses alternately in alternate horizontal scanning cycles 1H, respectively, as shown in FIG. 2.

If horizontal scanning frequency is decreased, there is a minute difference in gain between the sampling of a reference pulse inserted in a white line and the sampling of a reference pulse inserted in a black line by an on/off signal for each line, i.e., by the on/off operation of the switch SW2 by the reference pulse. If the number of all the lines is an odd number, the lines flickers. Therefore, the D flip-flop 28 is reset by the vertical synchronizing signal VD provided by the synchronous separation circuit 22 so that the sampling condition is the same for all the fields.

The background pulse is applied as a closing command signal through a buffer 30 to the switch SW1. The reference pulse is applied as a closing command signal through a buffer 32 to the switch SW2.

Figure 3:
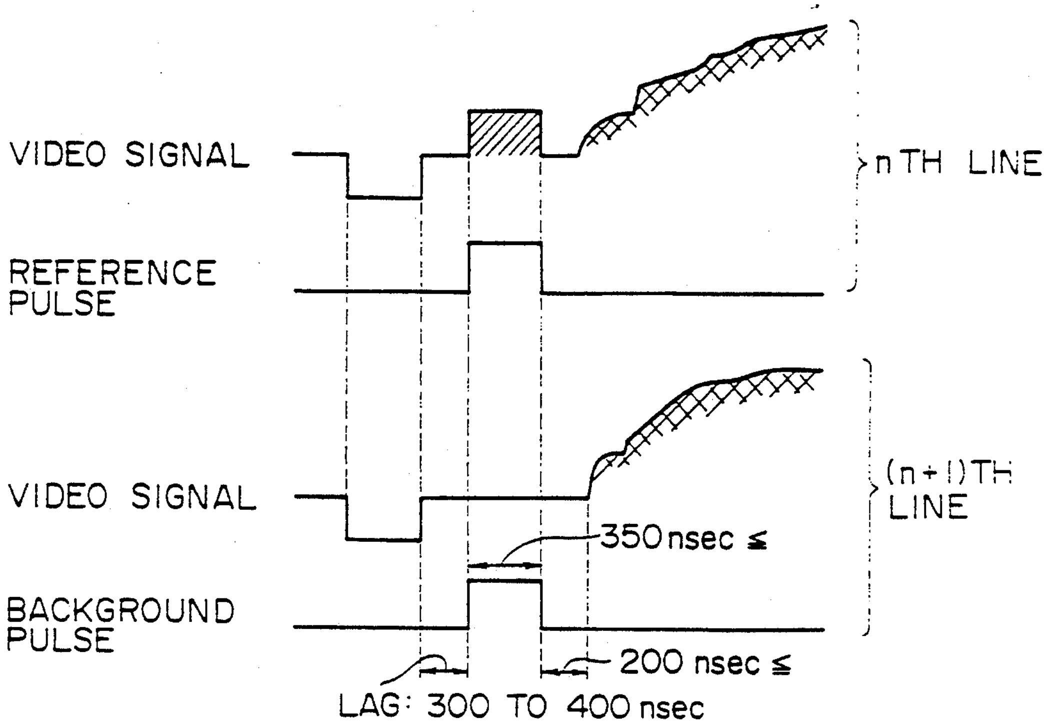
FIG. 3 is a diagram showing the relation between a video signal, a reference pulse and a background pulse used in the contrast control circuit of FIG. 1.

The output signal of the video frequency amplifier 4 of the CRT control circuit shown in FIG. 4 applied to the capacitor C1 is clamped by the switch SW1 so that the potential of the pedestal level is zero while the background pulse is HIGH on an (n+1)th horizontal scanning line as shown in FIG. 3. The leading edge of the reference pulse inserted in the video signal is sampled by the switch SW2 while the reference pulse is HIGH on an nth horizontal scanning line as shown in FIG. 3. Accordingly, the reference pulse of a positive potential with respect to the ground is detected in every other horizontal scanning cycle, i.e., once in two horizontal scanning cycle.

The operational amplifier OP1 compares the voltage of the peak value of the reference pulse sampled by the action of the switch SW2 with a contrast voltage VR1 specified by the user, and provides a control voltage to control the gain of the video frequency amplifier 4 so that the voltage of the peak value of the reference pulse will coincide with the contrast voltage VR1 and applies the control voltage to the video frequency amplifier 4 for feed back control.

The contrast control circuit of the present invention is capable of controlling the contrast even if the length of the back porch is about half the 1.6 μ sec.

The contrast control circuit of the present invention shown in FIG. 1 differs from the conventional contrast control circuit shown in FIG. 5 only in the method of producing the reference pulse and the background pulse, and is provided additionally only the D flip-flop 28 which generates a reset pulse in order that the cycles of the outputs of the monostable multivibrators 24 and 26 are twice the horizontal scanning cycle, and the phases of the outputs of the monostable multivibrators 24 and 26 are shifted by one horizontal scanning cycle relative to each other.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A contrast control circuit comprising:

a clamping means for clamping a video signal so that the potential of the pedestal level is held zero once every N horizontal scanning cycles, where N is an integer not smaller than two;

a voltage detecting means for detecting the reference voltage of a reference pulse inserted in a horizontal back porch, once every N horizontal scanning cycles other than the horizontal scanning cycle in which said clamping means clamps a video signal so that the potential of the pedestal level is held zero; and a control means which generates a contrast control signal on the basis of the reference voltage detected by said voltage detecting means and a specified voltage specified by operating a specified voltage setting source.

2. A contrast control circuit according to claim 1, wherein N=2.

3. A contrast control circuit which comprises:

means for extracting a horizontal synchronizing signal from an input video signal each horizontal scanning cycle;

means for generating a background pulse in response to the horizontal synchronizing signal once every N horizontal scanning cycles, where N is an integer not smaller than two;

means for generating a reference pulse in response to the horizontal synchronizing signal once every N horizontal scanning cycles signal other than the horizontal scanning cycle in which said background pulse is generated;

means for inserting said reference pulse in a back porch of the video signal;

means for clamping the video signal so that the potential of the pedestal level is held zero in response to said background pulse;

means for detecting the voltage of said reference voltage inserted in said back porch; and means for generating a contrast control signal on the basis of the detected voltage and an operator specified voltage;

4. The contrast control circuit according to claim 3 wherein N=2.

5. The contrast control circuit of claim 3 wherein the means for extracting is performed by a synchronous separation circuit.

6. The contrast control circuit of claim 5 wherein the synchronous separation circuit applies the horizontal synchronizing signal to a first and a second monostable multivibrator to generate said background and reference pulses, respectively.

7. The contrast control circuit of claim 6 wherein the horizontal synchronizing signal is applied to a clock input terminal of a D-type flip-flop and an output and an inverted output of the flip-flop are applied respectively to a reset terminal of the first monostable multivibrator and a reset terminal of the second monostable multivibrator so that the first and second multivibrators provide output pulse in alternate horizontal scanning cycles.

* * * * *